United States Patent
Brickell et al.

(10) Patent No.: US 7,765,544 B2
(45) Date of Patent: Jul. 27, 2010

(54) METHOD, APPARATUS AND SYSTEM FOR IMPROVING SECURITY IN A VIRTUAL MACHINE HOST

(75) Inventors: Ernie F. Brickell, Portland, OR (US); Clifford D. Hall, Orangevale, CA (US); Joseph F. Cihula, Hillsboro, OR (US); Richard A. Uhlig, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1592 days.

(21) Appl. No.: 11/016,653

(22) Filed: Dec. 17, 2004

(65) Prior Publication Data
US 2006/0136910 A1   Jun. 22, 2006

(51) Int. Cl.
- G06F 9/455   (2006.01)
- G06F 17/00   (2006.01)
- G06F 17/30   (2006.01)
- G06F 3/048   (2006.01)
- G06F 15/16   (2006.01)

(52) U.S. Cl. .............................. 718/1; 709/229; 726/1; 726/2; 715/767

(58) Field of Classification Search .............. 707/5, 707/6, 9, 200; 726/26, 27, 28, 29, 30, 1–2; 718/1; 715/767; 709/229
See application file for complete search history.

(56) References Cited

U.S. PATENT DOCUMENTS

| | | | |
|---|---|---|---|
| 5,649,099 A * | 7/1997 | Theimer et al. | 726/4 |
| 5,922,044 A * | 7/1999 | Banthia | 709/203 |
| 6,317,742 B1 * | 11/2001 | Nagaratnam et al. | 707/9 |
| 7,272,799 B2 * | 9/2007 | Imada et al. | 715/767 |
| 7,383,327 B1 * | 6/2008 | Tormasov et al. | 709/220 |
| 7,506,265 B1 * | 3/2009 | Traut et al. | 715/763 |
| 7,577,722 B1 * | 8/2009 | Khandekar et al. | 709/220 |
| 7,631,089 B2 * | 12/2009 | Knauerhase et al. | 709/229 |
| 7,640,543 B2 * | 12/2009 | Vij et al. | 718/1 |
| 2002/0173863 A1 * | 11/2002 | Imada et al. | 700/83 |
| 2003/0018909 A1 * | 1/2003 | Cuomo et al. | 713/200 |
| 2004/0128394 A1 * | 7/2004 | Knauerhase et al. | 709/229 |
| 2005/0125537 A1 * | 6/2005 | Martins et al. | 709/226 |
| 2006/0130060 A1 * | 6/2006 | Anderson et al. | 718/1 |
| 2007/0089111 A1 * | 4/2007 | Robinson et al. | 718/1 |

* cited by examiner

*Primary Examiner*—Meng-Ai An
*Assistant Examiner*—Jennifer N To
(74) *Attorney, Agent, or Firm*—Trop, Pruner & Hu, P.C.

(57) ABSTRACT

A method, apparatus and system for improving security on a virtual machines host is described. A shared file system on the host may include annotations usable by a service module to access files across VMs and to enforce security policies. The service module may additionally enable a unified user interface to improve usability of the host.

20 Claims, 4 Drawing Sheets

HOST 100

METHOD, APPARATUS AND SYSTEM FOR IMPROVING SECURITY IN A VIRTUAL MACHINE HOST

BACKGROUND

Computer viruses are a common problem for computer users. One typical mode of attack is to send an electronic mail message (e-mail) containing a file attachment to an unsuspecting user's computer. The file attachment contains malicious attack code, and the e-mail may contain some inducement for the user to launch the file attachment. When the user clicks on the file attachment, the attack code embedded in the file is executed. The attack code accesses an address book and sends the file attachment in an e-mail to addresses found in the address book. The attack code may then try to modify files on the user's computer or obtain other files and mail them back to the attackers.

Propagation of such an attack is rapid. Once one unsuspecting user launches the file attachment, the virus quickly spreads to other unsuspecting users, who then perpetuate the problem. Such viruses have been known to overwhelm computer networks and cause millions of dollars of damage to network operators, companies, and users.

Techniques exist to purge viruses from affected computers. Such techniques, however, are often are used only after the virus has been detected and many computers have been infected. New methods are desired that will slow down the propagation of computer viruses and other malicious code, thus allowing the virus detectors to detect and delete the viruses before the damage becomes widespread.

Along with improving the ability to detect and slow such attacks, it is also desirable to prevent or limit damage to users' systems and access to users' data. The ideal world in which users would never run suspicious files will never exist, so a practical solution must recognize this and attempt to prevent or limit these programs from damaging the user's system and accessing the user's data.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for improving security in a virtual machine ("VM") environment. More specifically, various embodiments of the present invention enhance the security on a virtualized device by enhancing the file management scheme on the host. Reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Embodiments of the present invention leverage various aspects of virtualization to enhance security on the VM host. Virtualization technology enables a single host computer (hereafter "VM host") running a virtual machine monitor ("VMM") to present multiple abstractions and/or views of the host, such that the underlying hardware of the host appears as one or more independently operating virtual machines ("VMs"). Each VM may function as a self-contained platform, running its own operating system ("OS") and/or a software application(s). Each VM is thus isolated from the others, ensuring that execution of one VM on the host does not interfere with the execution of the other VMs. The VMM manages allocation of resources on the host and performs context switching as necessary to cycle between various virtual machines according to a round-robin or other predetermined scheme.

Figure 1:
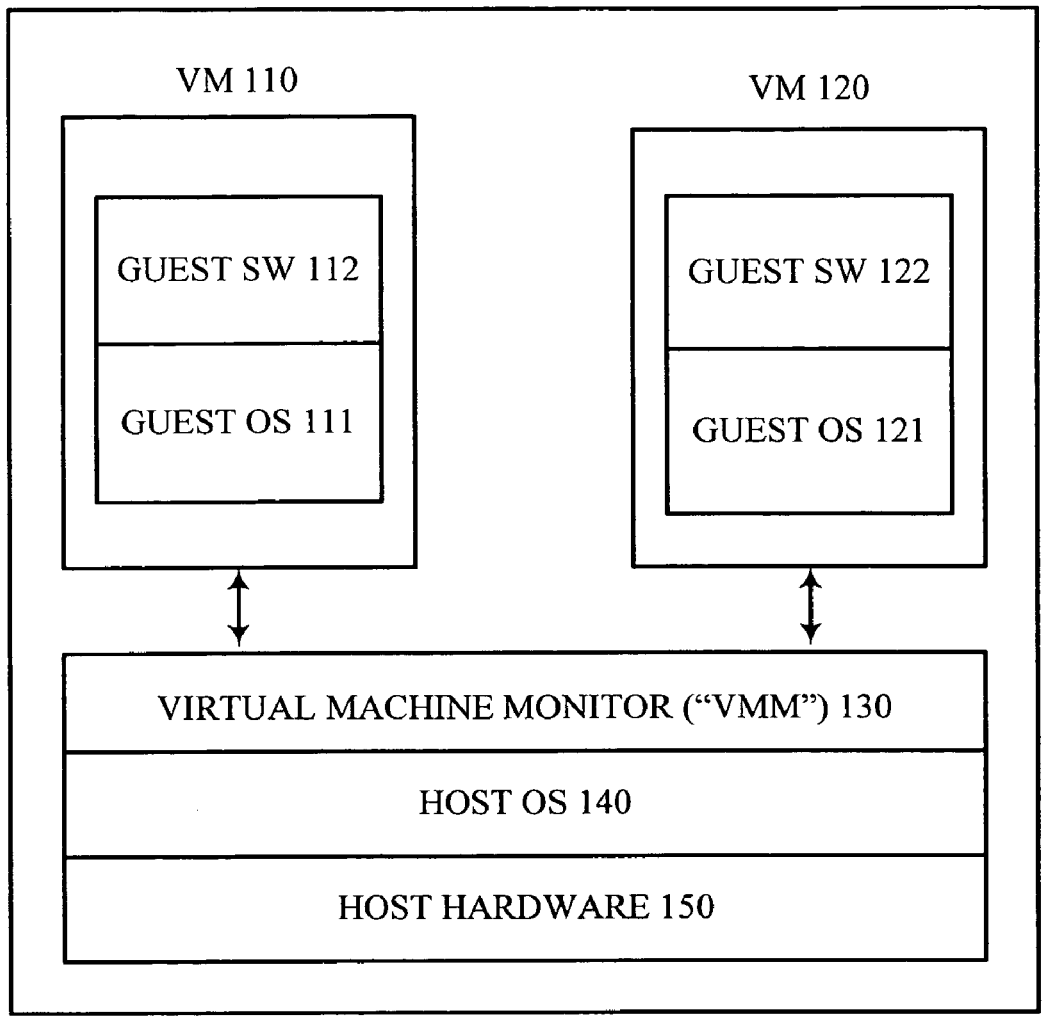
FIG. 1 illustrates an example of a typical VM host.

FIG. 1 illustrates an example of a typical virtual machine host platform ("Host 100") within which embodiments of the invention may be implemented. As previously described, a virtual-machine monitor ("VMM 130") typically runs on the host platform and presents an abstraction(s) and/or view(s) of the platform (also referred to as "virtual machines" or "VMs") to other software. Although only two VM partitions are illustrated ("VM 110" and "VM 120", hereafter referred to collectively as "VMs"), these VMs are merely illustrative and additional virtual machines may be added to the host. VMM 130 may be implemented in software (e.g., as a standalone program and/or a component of a host operating system, illustrated as "Host OS 140"), hardware, firmware and/or any combination thereof. It is well known to those of ordinary skill in the art that although Host OS 140 is illustrated in FIG. 1, this component is optional (e.g., a "hypervisor").

VM 110 and VM 120 may function as self-contained platforms respectively, running their own "guest operating systems" (i.e., operating systems hosted by VMM 130, illustrated as "Guest OS 111" and "Guest OS 121" and hereafter referred to collectively as "Guest OS") and other software (illustrated as "Guest Software 112" and "Guest Software 122" and hereafter referred to collectively as "Guest Software"). Each Guest OS and/or Guest Software operates as if it were running on a dedicated computer. That is, each Guest OS and/or Guest Software may expect to control various events and have access to hardware resources on Host 100. Additionally, each Guest OS typically includes its own "virtual" file system (e.g., Guest OS 111 may include a file system that only sees files accessible by VM 110). Within each VM, the Guest OS and/or Guest Software may behave as if they were, in effect, running on Host 100's physical hardware ("Host Hardware 150"). In reality however, VMM 130 has ultimate control over the events and hardware resources and allocates resources to the Virtual Machines according to its own policies.

Given the complexity and processing requirements of virtualization, this technology has typically been available only on workstations, servers and/or mainframes for use by sophisticated users. As processor technology advances, however, virtualization is being made available in the desktop environment for use by average users. In this environment, the most likely users are unlikely to be computer professionals (e.g., information technology specialists in corporate environments) but rather less sophisticated users (e.g., home personal computer ("PC") users and/or non-technical, less sophisticated corporate users). The applications that run within the desktop environment and the types of uses for the applications may also differ from corporate applications. For example, one use of virtualization in a home (and the associated advantage of running one or more independent VM's on a host) may be for each family member to be allocated a VM partition with their own customized environment, e.g., a gaming VM partition, a Personal Video Recorder ("PVR") appliance VM, an enterprise Information Technology ("IT") supplied VM for telecommuting, etc. In this environment, the average home PC user may be overwhelmed by the task of understanding and/or managing the VM partitions (e.g., moving files, setting up access permissions, etc.).

Figure 2:
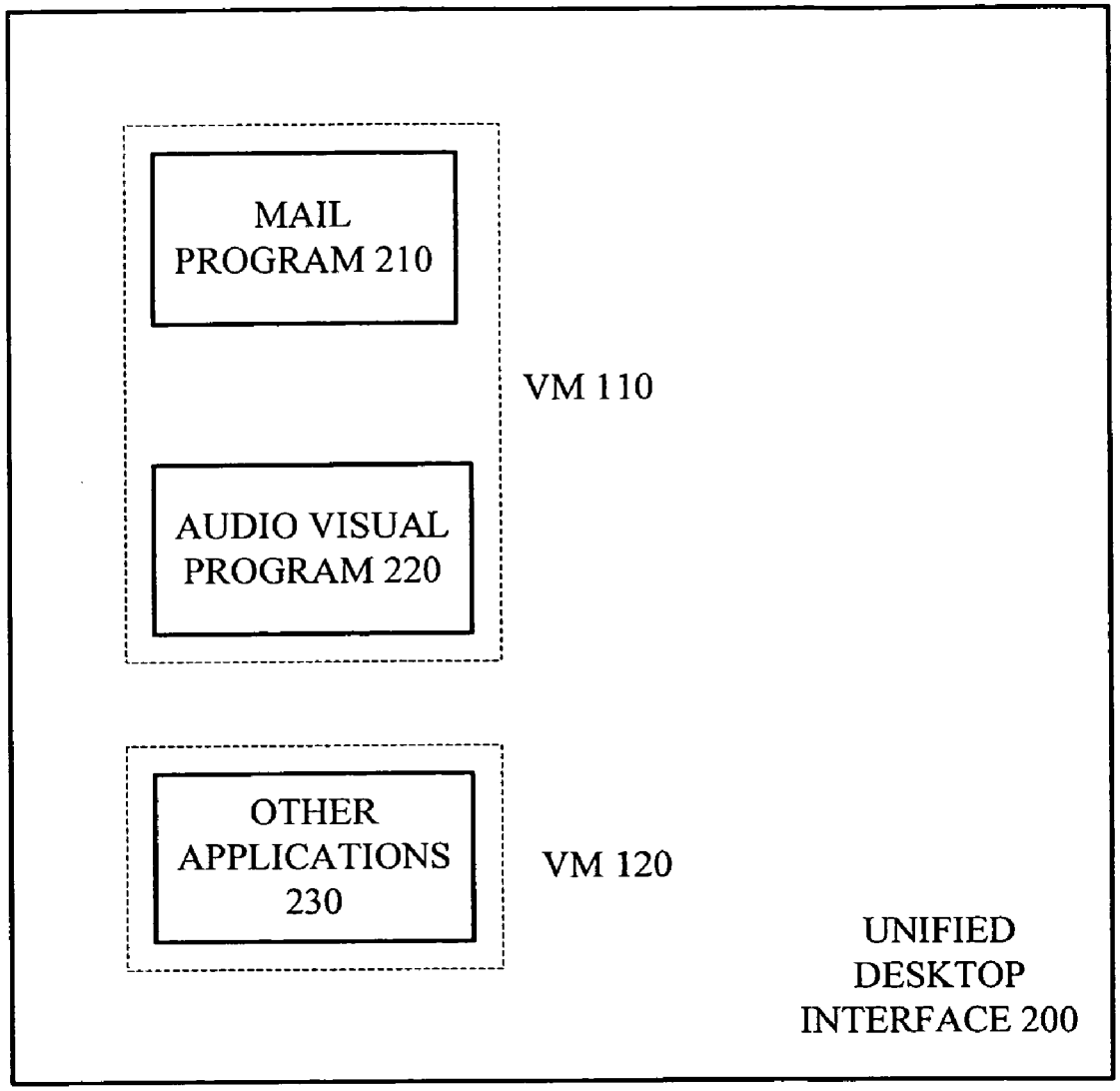
FIG. 2 illustrates an example of a unified user interface on the desktop of the VM host according to an embodiment of the present invention.

Embodiments of the present invention provide for improved security on Host 100 by enhancing file management on the host. An embodiment of the invention also provides improved usability by enabling the user to view the host as a cohesive desktop device (i.e., a non-virtualized host). Thus, for example, in one embodiment, a unified desktop interface and a unified or shared file system may be implemented on Host 100. An example unified desktop interface is illustrated in FIG. 2. Users may interact with Guest Software on a VM host via a unified graphical user interface (the user interface hereafter referred to as "Unified Desktop Interface 200"). In various embodiments, the view presented to the user may resemble a typical desktop, but unknown to the user, the desktop may in fact represent applications executing in various VMs on the host.

As illustrated in FIG. 2, the user may be presented with Unified Desktop Interface 200, which is a logical representation of the views of all or a subset of the various VMs on Host 100 such that the user can see and/or launch applications in one or more VMs from this view. Thus, for example, if the user has access to all the VMs on Host 100, then the various applications in each partition may be visible and accessible to the user in Unified Desktop Interface 200. Alternatively, the user may only have permission to access a subset of VMs on the host, in which case the applications visible and accessible to the user may include only those contained in the authorized VMs. As illustrated, Mail Program 210, Audio Visual Program 220 and various other applications (shown collectively as "Other Applications 230") are presented to the user in a simplified and/or unified view of Host 100.

Unified Desktop Interface 200 illustrated in FIG. 2 is merely an example of an interface that the user may see, in which there is minimal indication that the host is virtualized. In an alternate embodiment, Unified Desktop Interface 200 may include a view of all the VMs as well as all the applications running in each VM. Various other unified interfaces may be implemented without departing from the spirit of embodiments of the present invention. Most importantly, by presenting a unified view to the user, embodiments of the present invention significantly improve the usability of a VM host because the user's experience may resemble that of a typical desktop PC user, namely one in which the user simply selects an application (i.e., Guest Software) on Host 100 to execute, without needing to specifically interact with the virtual partitions on the PC and/or needing to know how to manage the Guest Software files within these partitions. Thus, for example, if the user selects Mail Program 210, as expected, the user may then be presented with the graphical output from Mail Program 210 within Unified Desktop Interface 200 without having to explicitly interact with VM 110.

In one embodiment, in order to maintain the security properties of the system, Unified Desktop Interface 200 may include an indication of which VM each application's interface belongs to. This embodiment minimizes the security implications of malicious software that may mimic an interface of a trusted piece of software (e.g. a corporate database manager) and the user may be tricked into interacting with the malicious software and giving it sensitive information (e.g. passwords, account numbers, etc.). These types of indications may be provided in a variety of ways without departing from the spirit of embodiments of the present invention. Details of these indications are outside the scope of embodiments of the present invention and further details of such indications are omitted herein in order not to unnecessarily obscure embodiments of the present invention. Embodiments of the present invention may, however, enforce policies consistent with ensuring the usability of Unified Desktop Interface 200 (e.g., ensuring that the interface is as close to the standard user experience as possible). Thus, for example, in various embodiments, if all VMs on Host 100 trusted VMs, Unified Desktop Interface 20 may not include any indication of where applications reside. Alternatively, in other embodiments, such indications may always appear if there are applications on Host 100 running in untrusted VMs.

Although invisible to the user, various elements on Host 100 enable the user to view and/or interact with all the VMs on Host 100 via Unified Desktop Interface 200. More specifically, in various embodiments of the present invention, a "service console" (described in further detail below) enables and/or supports the unified interface by redirecting the input and/or output from the user and the VMs For the purposes of this specification, input and/or output shall include any form of input and/or output that Host 100 may recognize. Thus, although "input" hereafter implies that it is a keystroke or a mouse click from the user, it may in fact include any other input scheme that Host 100 is capable of receiving. Similarly, although "output" is described hereafter as primarily being visual output, embodiments of the present invention are not so limited. Output may therefore include other types of output such as audio output.

Figure 3:
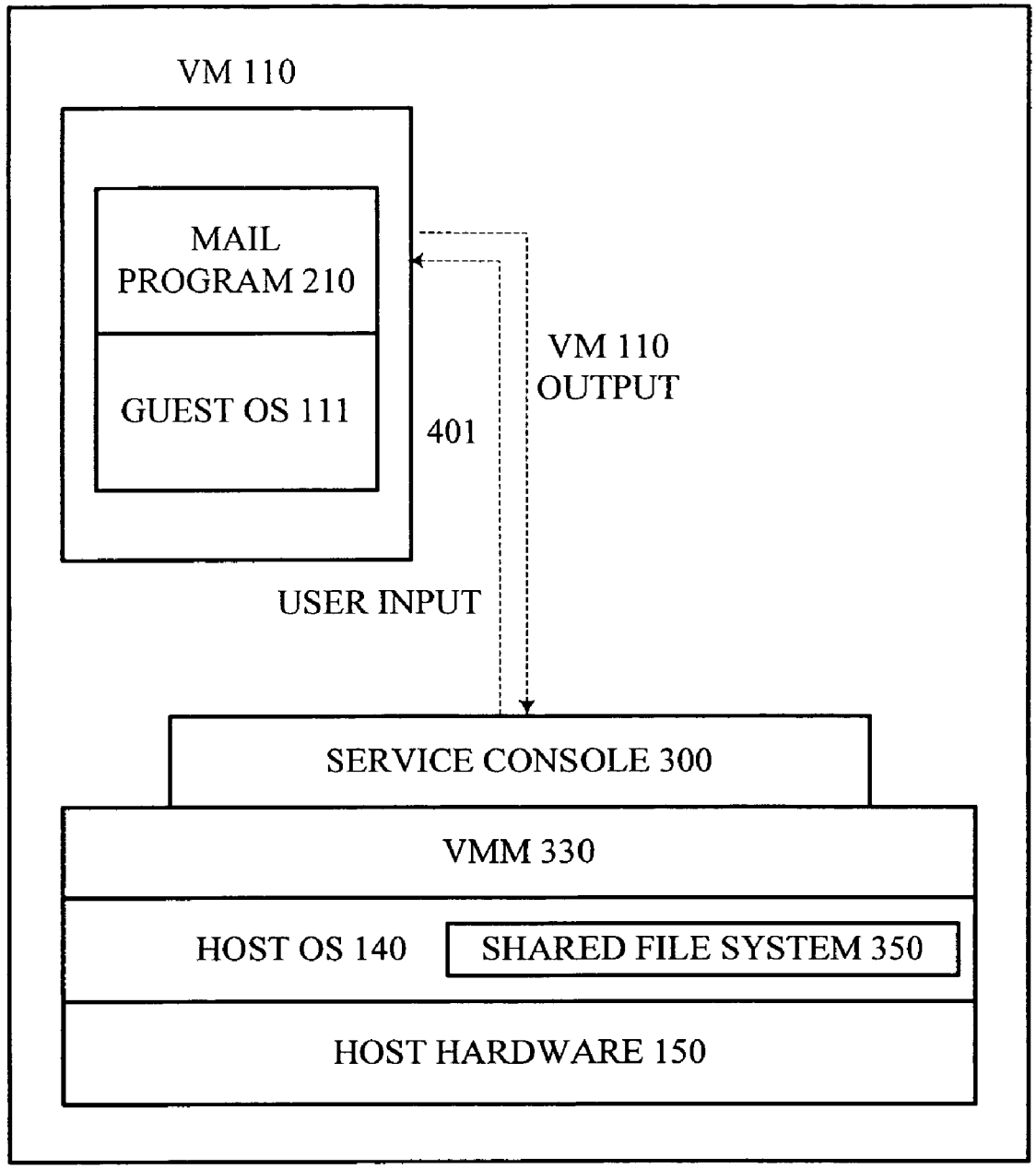
FIG. 3 illustrates an embodiment of the present invention.

In one embodiment, a dedicated partition on Host 100 may be designated the service console with access to all the VMs on Host 100. FIG. 3 illustrates conceptually an embodiment of how the service console ("Service Console 300") functions to present Unified Desktop Interface 200 to the user. Although Service Console 300 is illustrated as a separate component from the VMM ("VMM 330"), embodiments of the invention are not so limited. Instead, in one embodiment, VMM 330 may include all the functionality of Service Console 300 while in an alternate embodiment, Service Console 300 may be a component that works in conjunction with VMM 330 (e.g., in an embodiment, Service Console 300 may comprise an enhanced VM partition). In various embodiments, input and/or output from the user and/or the VMs (e.g., VM 110 and VM 120) may be received by VMM 330 and passed on to Service Console 300 for processing. It will be readily apparent to those of ordinary skill in the art that Service Console 300 may be implemented in software, hardware, firmware and/or any combination thereof. Additionally, VMM 330 may include various enhancements over existing VMMs, either to include the functionality of Service Console 300 and/or to interact with Service Console 300. It will therefore also be readily apparent to those of ordinary skill in the art that VMM 330 may be implemented in software (e.g., as a standalone program and/or a component of a host operating system), hardware, firmware and/or any combination thereof.

In one embodiment, to enable Service Console 300 and/or Unified Desktop Interface 200 (which represents the output in Service Console 300), Host 100 may include a shared file system (illustrated conceptually as "Shared File System 350", contained within Host OS 140). In one embodiment, Shared File System 350 may comprise an extended file system, e.g., existing file systems within Host OS 140 (as illustrated in FIG. 3) may be extended to recognize additional attributes. Regardless of how it is implemented, Shared File System 350 allows files to be shared across VMs, thus enabling Service Console 300 to present the user with Unified Desktop Interface 200 that includes views of the file system.

Operating systems typically include an application (hereafter referred to as a "file manager") that provides users with a graphical or textual view and an interface to the file system (e.g. Windows Explorer™ in a Microsoft Windows™ operating system). Current virtualization software typically creates a separate file system for each VM on the VM host. As a result, the file manager that runs in each VM is only able to see the file system of that VM. A user may therefore be forced to interact with several file managers to access all of the files the user is working with. According to embodiments of the present invention, by providing a shared file system on Host 100 (e.g., Shared File System 350), the user may interact with a single file manager that interfaces with the Shared File System 350 and yet maintains the security properties of the system.

To enable file sharing, Shared File System 350 may include a scheme for annotating all files on Host 100 with an identifier. The identifier may include various types of information such file ownership, permissions, etc. Thus, for example, when a VM attempts to open a file, the annotation in the file system may be examined to determine whether the VM has the appropriate permissions to access the file. Since the annotation determines the permissions for the file, and Service Console 300 handles the underlying tasks of locating the file, launching the file in the appropriate VM and displaying the output within Unified Desktop Interface 200 (i.e., within the context of Service Console 300), the user need not be aware of any of these actions.

Although the above-described scheme increases the usability of a VM host, the ability for users to "share" files across VMs raises various security concerns. As previously described, computer attacks are becoming an increasingly common problem. These types of attacks can result in significant damage to the computer system. Embodiments of the present invention may, however, address the security concerns by providing an additional barrier that slows down and/or prevents the spread of potential damage. For example, in one embodiment, if Guest Software 112 (in VM 110) desires to access a file that is owned by and/or resides in VM 120, it may do so if the annotation in the file system indicates that Guest Software 112 is authorized to access the file in VM 120. Thus, contrary to traditional virtualization schemes whereby files are completely restricted to the VM in which they originate, according to an embodiment of the present invention, Guest Software in various VMs may access files across VMs. Although the action may be handled seamlessly by Service Console 300, this scenario presents a security risk for VM 110 because in the event the file is infected with malicious code, the code may not only infect VM 120, but also VM 110. One way to prevent this type of "cross-VM" infection may be to restrict files to individual VMs (e.g., if the Guest Software has access to VM 110 but not VM 120, the Guest Software may not access any files from VM 120 because VM 110 does not know that the files in VM 120 exist). Unfortunately, this type of restriction may undermine the advantages provided by virtualization, and again, may cause an unsophisticated user to shy away from utilizing a virtual environment.

In one embodiment of the present invention, to enhance the security of the VM host, the annotations in Shared File System 350 may be utilized to enforce various policies. In various embodiments, the annotations may define policies for all activities in each VM, including the types of applications that can be installed in various VMs, what files can be used by those applications, what VMs may access each file (regardless of which VM owns the file), etc. The policies may encompass files that exist on Host 100, files that are created on Host 100, as well as files received on Host 100 from remote sources. In one embodiment, the policies specified by the annotations may be enforced by Service Console 300. Thus, for example, the annotations in the file system for certain VMs may include an extremely strict security policy which does not allow the user to import any files into the VM that were not signed by a trusted party. Additionally, a VM may also have a policy that would not allow a user to export any file to another VM. In other embodiments, various VMs may include a more relaxed policy that allows a user to import data files, but not install new applications. Yet another VM may have an open policy that allows a user to do anything in the VM. Similar to the policy for moving and/or copying files, a policy may also be implemented to monitor movement of information to a "clipboard". It will be readily apparent to those of ordinary skill in the art that the above policies defined by the annotations in the file system and merely exemplary and embodiments of the present invention are not so limited. Instead, embodiments of the present invention may be expanded to include various other types of policies designed to enhance the security of the various partitions on Host 100.

Embodiments of the present invention may additionally enable files and data between to be moved between VMs. Because the attributes of a file may restrict the actions that can be performed on that file, a user may wish to change the actions that are allowed for a particular file. The concept of file attributes are well known to those of ordinary skill in the art and further description thereof is omitted herein. Thus, for example, in one embodiment, the annotations in a corporate VM (e.g., VM 120) may define a policy that prohibits the user from running any executable received in email in VM 120. The user may, however, receive an email from his/her IT department that contains a very important executable that is needed to fix one of the corporate applications running in VM 120. According to an embodiment of the present invention, the user may be allowed to do this, unless the IT policies on his/her system completely forbid it. In one embodiment, the user may run a tool in VM 120 that would permit the user to "share" a file by altering the attributes of files to permit them to be accessed by VM 120. To enhance the security of the system, in one embodiment, VM 120 may only "pull" the "shared" file, to prevent untrusted software from "pushing" its files to trusted VMs. The concept of "pulling" and "pushing" are well known in the art and further description thereof is omitted herein.

According to an embodiment of the invention, the annotations may define policies that operate on data other than files. Thus, for example, in one embodiment, the annotations may define a policy that restricts which IP addresses a VM may access. This feature may be used, for example, to create a higher-level policy that allows one VM to only access intranet sites and another to only access internet sites. Another example of how the annotations may define policies that operate on data other than files includes a policy that restricts which devices are accessible, and how, by each VM. Thus, for example, a policy may be defined that only authorized USB devices may be be used by a selected VM. The above described scenarios are merely exemplary and the attributes may be in various other embodiments to define policies that enhance the security and/or usability of VMs on Host 100.

Figure 4:
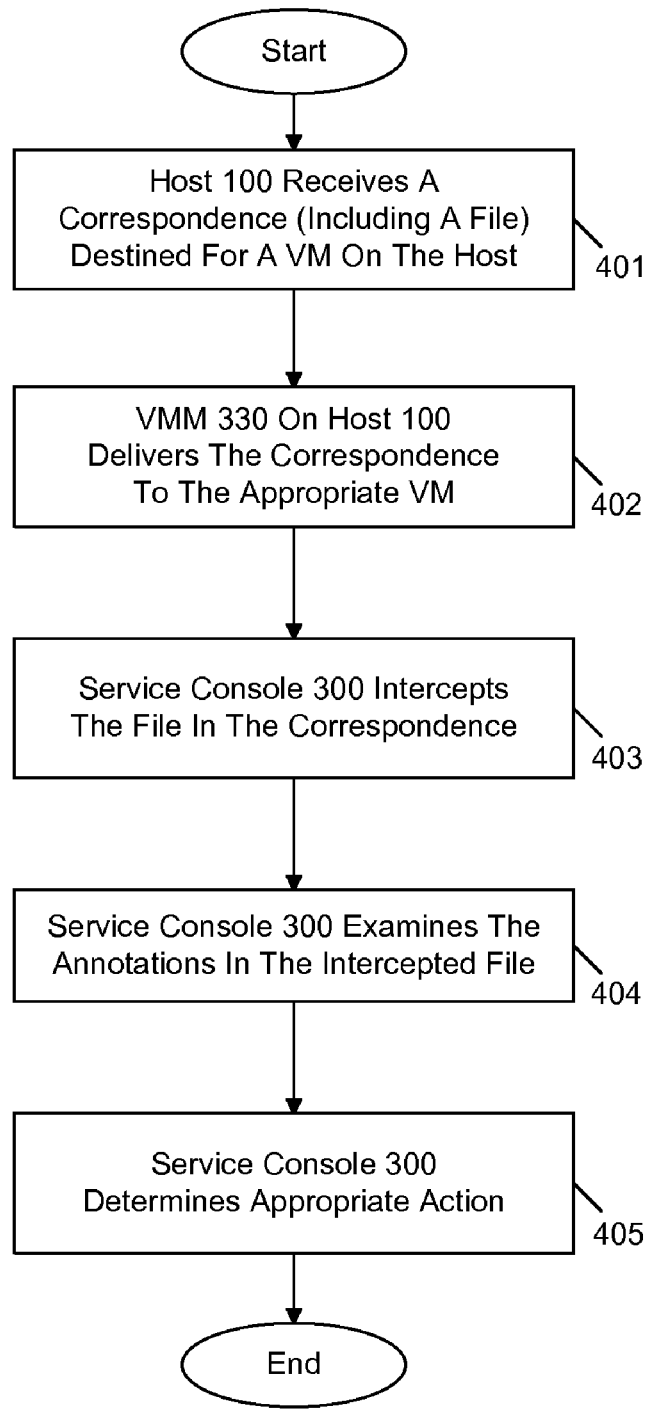
FIG. 4 is a flowchart that conceptually illustrates how the service module enforces security policies on a VM host according to an embodiment of the present invention.

FIG. 4 is a flowchart illustrating an embodiment of the present invention. Although the following operations may be described as a sequential process, many of the operations may in fact be performed in parallel and/or concurrently. In addition, the order of the operations may be re-arranged without departing from the spirit of embodiments of the invention. In 401, Host 100 may receive a correspondence including a file destined for Guest Software in a VM on the host. In 402, VMM 330 may direct the correspondence to the appropriate VM on the host, while in 403, the file in the correspondence may be intercepted by Service Console 300. In 404, Service Console 300 may examine the annotations in the file, and based on the annotations, Service Console 300 may determine an appropriate action in 405 (e.g., deliver the file to the VM, send the file to a different VM, etc.).

The hosts, according to embodiments of the present invention, may be implemented on a variety of computing devices. According to an embodiment of the present invention, computing devices may include various components capable of executing instructions to accomplish an embodiment of the present invention. For example, the computing devices may include and/or be coupled to at least one machine-accessible medium. As used in this specification, a "machine" includes, but is not limited to, any computing device with one or more processors. As used in this specification, a machine-accessible medium includes recordable/non-recordable media (such as read-only memory (ROM), random-access memory (RAM), magnetic disk storage media, optical storage media and flash memory devices).

According to an embodiment, a computing device may include various other well-known components such as one or more processors. Thus, the computing device (e.g., Host 100) may include any type of processor capable of executing software, including microprocessors, multi-threaded processors, multi-core processors, digital signal processors, co-processors, reconfigurable processors, microcontrollers and/or any combination thereof. The processors may be arranged in various configurations such as symmetric multi-processors (e.g., 2-way, 4-way, 8-way, etc.) and/or in other communication topologies (e.g., toroidal meshes), either now known or hereafter developed. The term "processor" may include, but is not necessarily limited to, extensible microcode, macrocode, software, programmable logic, hard coded logic, etc., capable of executing embodiments of the present invention.

The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including PCI, PCI Express, FireWire and other such current and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for enhancing security of a host, comprising:
providing a shared file system on the host, the host comprising virtual machines ("VMs"), the shared file system including an annotation scheme that enables a user to define security policies for at least one of (a) files and (b) data for each of the VMs;
enabling a service console, coupled to the host and the VMs, to access the shared file system to enforce the security policies.

2. The method according to claim 1 further comprising providing a unified desktop interface capable of presenting a unified view of the VMs on the host.

3. The method according to claim 2 wherein the unified view of the VMs on the host includes a unified view of applications and files contained within each of the VMs.

4. The method according to claim 2, including enabling the service console to locate a file, launch the file in an appropriate VM selected from the VMs based on the security policies of the VMs, and display an output from the file within the unified desktop interface.

5. The method according to claim 1 wherein the service console is capable of accessing each of the VMs.

6. The method according to claim 1 further comprising:
providing a unified file manager capable of visually presenting information pertaining to files in each of the VMs on the host.

7. The method according to claim 2, wherein the VMs include first and second VMs a user is authorized to access and a third VM the user is not authorized to access, and the unified desktop interface is capable of presenting the user a view of the first and second VMs but not the third VM.

8. The method according to claim 1, wherein the annotation scheme is capable of defining a security policy that allows a first VM to pull a shared file from a second VM but disallows the second VM to push the shared file to the first VM, the first and second VMs included in the VMs.

9. The method according to claim 1, wherein the service console is capable of redirecting a user's input from a first VM to a second VM, the first and second VMs included in the VMs.

10. The method according to claim 1, wherein the annotation scheme is capable of defining a security policy that allows a first VM to exchange a shared file with a second VM, the first and second VMs included in the VMs.

11. An article comprising a machine-accessible medium having stored thereon instructions that, when executed by a machine, cause the machine to:
provide a shared file system on a host, the host comprising virtual machines ("VMs"), the shared file system including an annotation scheme that enables a user to define security policies for at least one of (a) files and (b) data for each of the VMs;
enable a service console, coupled to the host and the VMs, to access the shared file system to enforce the security policies.

12. The article according to claim 11 wherein the instructions, when executed by the machine, further cause the machine to provide a unified desktop interface capable of presenting a unified view of the VMs on the host.

13. The article according to claim 12 wherein the instructions, when executed by the machine, further cause the machine to provide the unified view of the VMs on the host, comprising a unified view of applications and files contained within each of the VMs.

14. The article according to claim 11 wherein the instructions, when executed by the machine, are further capable of causing the service console to access each of the VMs.

15. The article according to claim 11 wherein the instructions, when executed by the machine, are further capable of causing the machine to provide a unified file manager capable of visually presenting information pertaining to files in each of the VMs on the host.

16. A host comprising:

virtual machines ("VMs") to couple to a processor;

a shared file system to be accessed by the VMs, including an annotation scheme to enable a user to define security policies for at least one of (a) files and (b) data for each of the VMs; and a service console, to couple to the VMs and to access the shared file system, via the processor, to enforce the security policies.

17. The host according to claim 16 further comprising a unified desktop interface capable of presenting a unified view of the VMs on the host.

18. The host according to claim 17 wherein the unified desktop interface is further capable of presenting a unified view of applications and files contained within each of the VMs.

19. The host according to claim 16 wherein the service console is capable of accessing each of the VMs and the annotation scheme defines the respective security policies in the shared file system for each of the VMs.

20. The host according to claim 16 further comprising a unified file manager capable of visually presenting a graphical interface to file systems respectively included in each of the VMs on the host.

* * * * *